United States Patent
Witts et al.

(10) Patent No.: US 12,013,300 B2
(45) Date of Patent: *Jun. 18, 2024

(54) TORQUE SENSING DEVICE AND METHOD

(71) Applicant: Kyocera AVX Components (Werne) GmbH, Werne (DE)

(72) Inventors: David Witts, Cambridge (GB); Paul Smith, Cambridge (GB)

(73) Assignee: Kyocera AVX Components (Werne) GmbH, Werne (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/313,019

(22) Filed: May 5, 2023

(65) Prior Publication Data

US 2023/0273080 A1 Aug. 31, 2023

Related U.S. Application Data

(63) Continuation of application No. 17/106,720, filed on Nov. 30, 2020, now Pat. No. 11,692,887.

(60) Provisional application No. 63/037,652, filed on Jun. 11, 2020.

(51) Int. Cl.
  *G01L 3/10* (2006.01)
  *G01L 5/22* (2006.01)

(52) U.S. Cl.
  CPC .............. *G01L 3/105* (2013.01); *G01L 5/221* (2013.01)

(58) Field of Classification Search
  CPC ..................... G01L 3/105; G01L 5/221
  See application file for complete search history.

(56) References Cited

U.S. PATENT DOCUMENTS

| | | | |
|---|---|---|---|
| 5,796,250 A | 8/1998 | Dames | |
| 8,453,518 B2 | 6/2013 | Diekmann et al. | |
| 9,528,858 B2 * | 12/2016 | Bertin | G01D 5/2053 |
| 11,460,326 B2 * | 10/2022 | Smith | G01D 5/2275 |

(Continued)

FOREIGN PATENT DOCUMENTS

| | | | | |
|---|---|---|---|---|
| DE | 102008006865 A1 * | 8/2009 | | G01L 3/105 |
| DE | 102015220624 | 4/2017 | | |

(Continued)

OTHER PUBLICATIONS

International Search Report and Written Opinion for PCT/IB2021/054833, dated Aug. 23, 2021, 14 pages.

*Primary Examiner* — Octavia Davis Hollington
(74) *Attorney, Agent, or Firm* — Dority & Manning, P.A.

(57) ABSTRACT

A torque sensor can be configured to detect the positions of rotor targets relative to the position of respective receiver structures. A torque sensor can include an oscillator circuit coupled to an excitation coil. The oscillator circuit can be configured to generate a periodic voltage signal and energize the excitation coil with the periodic voltage signal. The inductive torque sensor can include a stator circuit board including receivers with receiver structures that are periodically repeated. The inductive torque sensor can include rotor targets coupled to respective rotors, the rotor targets can be configured to affect the strength of the inductive coupling between the excitation coil and the respective receivers. The inductive torque sensor can include processing circuitry configured to provide signals associated with positions of the rotor targets relative to their respective receiver structures.

18 Claims, 9 Drawing Sheets

(56) References Cited

U.S. PATENT DOCUMENTS

| | | | |
|---|---|---|---|
| 11,692,887 B2* | 7/2023 | Witts | G01L 5/221 |
| | | | 73/862.331 |
| 11,698,275 B2* | 7/2023 | Witts | G01D 5/225 |
| | | | 324/207.17 |
| 2019/0310148 A1 | 10/2019 | Bertin | |
| 2021/0055135 A1 | 2/2021 | Smith et al. | |
| 2021/0372823 A1 | 12/2021 | Witts et al. | |
| 2021/0381853 A1* | 12/2021 | Witts | G01D 5/2053 |

FOREIGN PATENT DOCUMENTS

| | | |
|---|---|---|
| EP | 1081454 | 3/2001 |
| WO | WO 2016/014891 | 1/2016 |

* cited by examiner

TORQUE SENSING DEVICE AND METHOD

PRIORITY CLAIM

The present application is a continuation of and claims the benefit of priority under 35 U.S.C. § 120 to U.S. patent application Ser. No. 17/106,720, filed Nov. 30, 2020, titled "Torque Sensing Device and Method," which, in turn, claims the benefit of priority under 35 U.S.C. § 119(e) to U.S. Prov. App. Ser. No. 63/037,652, filed Jun. 11, 2020, titled "Torque Sensing Device and Method"; each of which is incorporated herein by reference in its entirety and for all purposes.

FIELD

The present disclosure relates generally to torque sensors and more specifically to a system and method for inductively detecting torque between a first member and a second member.

BACKGROUND

Various forms of torque sensors are known for detecting the torque between a first member relative to a second member. In some instances, one member can carry an inductive sensor element while the other member can carry a magnetic or conductive target. The inductive sensor element can be configured to detect torque based on electromagnetic fields resulting from positions of the soft magnetic or conductive target relative to the inductive sensor element.

SUMMARY

Aspects and advantages of embodiments of the present disclosure will be set forth in part in the following description, or may be learned from the description, or may be learned through practice of the embodiments.

One example aspect of the present disclosure is directed to a torque sensor. The torque sensor includes at least one excitation coil. The torque sensor includes at least one oscillator circuit coupled to the excitation coil. The oscillator circuit is configured to generate a period voltage signal and energize the excitation coil with the periodic voltage signal. The torque sensor includes a first channel. The first channel includes a first receiver. The first receiver can include a plurality of first receiver structures that are periodically repeated. The first channel can include a first rotor target configured be coupled to a first rotor. The first rotor target can be configured to affect a strength of the inductive coupling between the excitation coil and the first receiver. The torque sensor can include a second channel. The second channel can include a second receiver. The second receiver includes a plurality of second receiver structures that are periodically repeated. The second receiver includes a second rotor target configured to be coupled to a second rotor. The second rotor target can be configured to affect a strength of the inductive coupling between the excitation coil and the second receiver. The torque sensor can include processing circuitry configured to provide a first signal processing circuitry configured to provide a first signal associated with the first channel indicative of a position of the first rotor target relative to the first receiver. The processing circuitry can be configured to provide a second signal associated with the second channel indicative of a position of the second rotor target relative to the second receiver. The torque sensor includes one or more features to reduce electromagnetic coupling of the first channel and the second channel.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
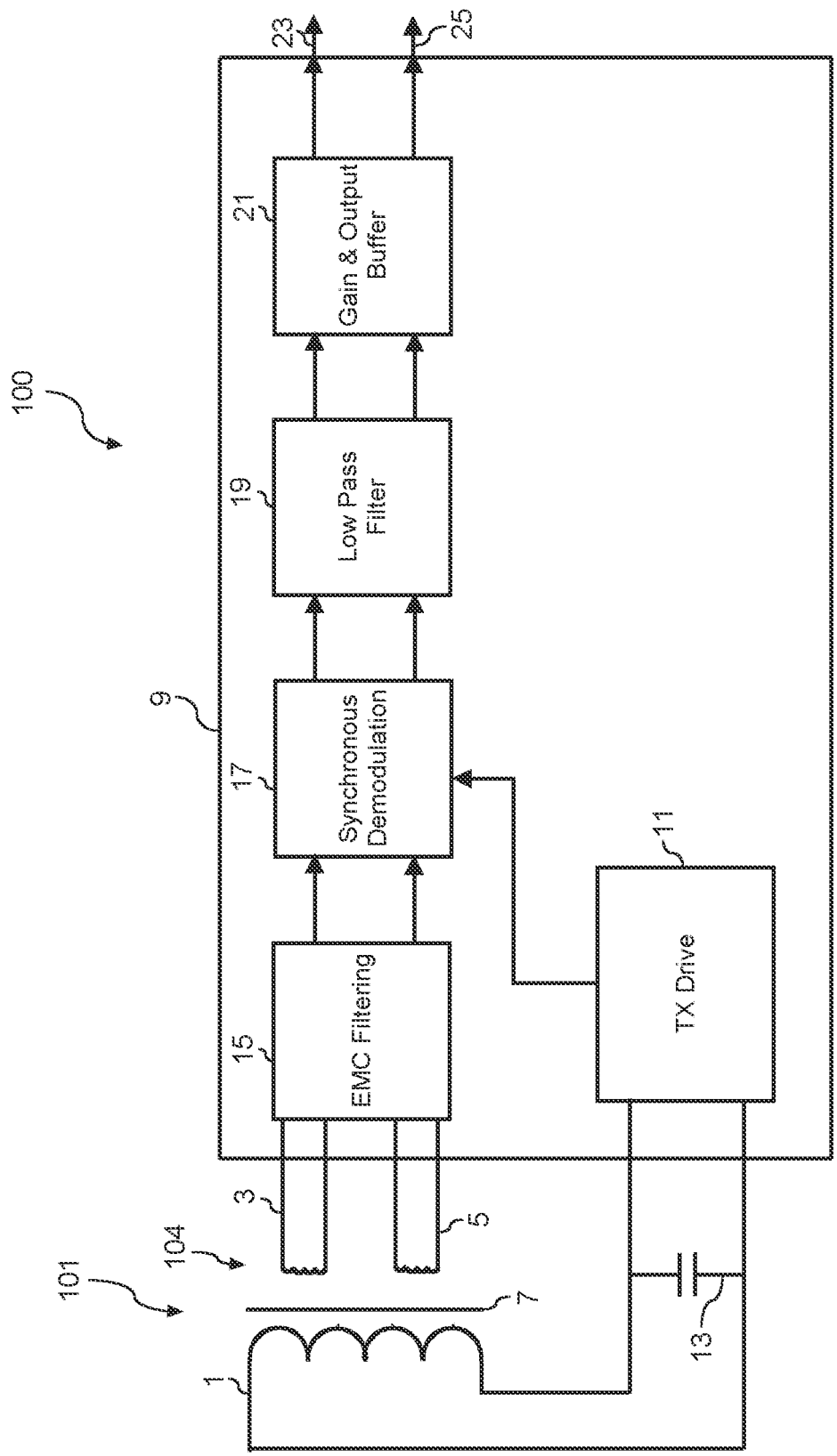
FIG. 1 depicts a schematic of select portions of a torque sensor including processing circuitry according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to torque sensors that determine torque for devices based on signals associated with the position of receivers relative to respective rotor targets located on the devices. The disclosed technology can use a variety of techniques to improve the accuracy of torque measurement. In particular, the disclosed technology uses various techniques and configurations to ensure decoupling (e.g., electromagnetic coupling) amongst receiver coils and/or target structures of different channels in the torque sensor. The techniques can include, for instance, having rotor targets that are composed of different types of materials, using different ratios of receiver periods relative to rotor targets, creating a time varying magnetic field in a rotor target that is phase shifted relative to a time varying magnetic field of another rotor target, and arranging the rotors so that the rotor targets are geometrically decoupled.

A torque sensor can be configured to determine torque for devices including those devices used to operate a motor vehicle. For instance, accurate determination of torque in a device, such as a steering column of a motor vehicle, can result in improvements in the operational safety of the associated motor vehicle. A torque sensor can determine the torque on the steering column of an automobile by using the strength of inductive coupling between rotor targets and respective receiver structures of a torque sensor arranged in the steering column to determine torque based on the relative positions of the rotor targets.

The torque sensor can include a plurality of channels, such as a first channel and a second channel. An oscillator circuit that is coupled to an excitation coil can be configured to generate a periodic voltage signal. The torque sensor can also include a stator circuit board that includes a plurality of receivers, such as one or more receivers associated with each channel. The torque sensor can include respective rotor targets for each channel, such as a first rotor target and a second rotor target coupled to different rotors. Furthermore, the torque sensor can include processing circuitry configured to provide signals associated with the position of the rotor targets relative to the receiver structures for each channel and therefore the position of the rotors. These signals can be processed for determination of torque.

More particularly, the torque sensor can include at least one excitation coil that is coupled to at least one oscillator circuit. The oscillator circuit can be configured to generate a periodic voltage signal and to energize the excitation coil with the periodic voltage signal. The periodic voltage signal (and consequent current) can induce electromotive forces in a plurality of receivers that respectively include a number of receiver structures. Each of the receiver structures can be periodically repeated within the receiver. Each receiver of the plurality of receivers can be a receiver coil (e.g., sine and/or cosine winding). Each of the plurality of receiver coils can have a respective period and can be configured to electromagnetically couple to a corresponding rotor target. In some embodiments, the plurality of receivers can include a first receiver and a second receiver. The first receiver can be associated with a first channel. The second receiver can be associated with a second channel.

A magnetic field generated by current flowing through the excitation coil can induce an electromotive force in each receiver (e.g., by an electromagnetic field) that generates a signal that is dependent on the position of a respective rotor target relative to a respective receiver of the plurality of receivers and the excitation coil. For instance, the first rotor target can modify the electromagnetic field in a manner that is detectable based on the position of the first rotor target relative to the first receiver. Further, the second rotor target can modify the electromagnetic field in a manner that is detectable based on the position of the second rotor target relative to the second receiver. Signals induced in the first receiver and the second receiver can be processed to determine torque.

One example aspect of the present disclosure is directed to a torque sensor. The torque sensor includes at least one excitation coil. The torque sensor includes at least one oscillator circuit coupled to the excitation coil. The oscillator circuit is configured to generate a period voltage signal and energize the excitation coil with the periodic voltage signal. The torque sensor includes a first channel. The first channel includes a first receiver. The first receiver can include a plurality of first receiver structures that are periodically repeated. The first channel can include a first rotor target configured be coupled to a first rotor. The first rotor target can be configured to affect a strength of the inductive coupling between the excitation coil and the first receiver. The torque sensor can include a second channel. The second channel can include a second receiver. The second receiver includes a plurality of second receiver structures that are periodically repeated. The second receiver includes a second rotor target configured to be coupled to a second rotor. The second rotor target can be configured to affect a strength of the inductive coupling between the excitation coil and the second receiver. The torque sensor can include processing circuitry configured to provide a first signal associated processing circuitry configured to provide a first signal associated with the first channel indicative of a position of the first rotor target relative to the first receiver. The processing circuitry can be configured to provide a second signal associated with the second channel indicative of a position of the second rotor target relative to the second receiver. The torque sensor includes one or more features to reduce electromagnetic coupling of the first channel and the second channel.

In some implementations, M is a number of the first receiver structures and N is a number of the second receiver structures such that $M=2N\pm1$. In these implementations, the first rotor target can have a plurality of target lobes that are periodically repeated. Each target lobe can have an angular width. The angular width of each target lobe of the first rotor target is approximately equal to an angular width corresponding to a single period of the plurality of second receiver structures of the second receiver.

In some implementations, a structural phase of the first receiver varies along both a circumferential direction and a radial direction of the first receiver. A structural phase shift in the radial direction of the first receiver occurs at a specific point along the radial direction of the first receiver. The structural phase shift can be approximately 180° (e.g., opposite phases).

In some embodiments, a structural phase of the first rotor target varies along both a circumferential direction and a radial direction of the rotor target in a manner corresponding to the first receiver. A first portion of the first rotor target can include, for instance, a conductive material and a second portion of the first rotor target comprises a magnetic and non-conductive material.

In some embodiments, a structural phase of the second receiver can vary along a circumferential direction and is constant along a radial direction of the second receiver. A structural phase of the second rotor target varies along a circumferential direction and is constant along a radial direction of the second rotor target in a manner corresponding to the second receiver.

In some embodiments, the structural phase of the first receiver varies continuously along at least a portion of the radial direction of the first receiver. The structural phase of the second receiver varies continuously along at least a portion of the radial direction of the second receiver. In some cases, the first receiver and the second receiver have a variation of structural phase in a radial direction in the first and second receiver structures which is of approximately equal magnitude but opposing directions with respect to each other.

In some embodiments, a time varying magnetic field created by the first rotor target is phase shifted relative to a time varying magnetic field created by the second rotor target. The time varying magnetic field created by the first rotor target can be phase shifted by about 90° relative to the time varying magnetic field created by the second rotor target. The second rotor target includes a resonant circuit having an inductance and a capacitance.

In some embodiments, the target lobes are not continuously repeated about an entire circumference of the first receiver. The plurality of target lobes of the first rotor target have less than 120° cumulative overlap with a plurality of target lobes of the second rotor target. For instance, the plurality of target lobes comprises a first set of target lobes and a second set of target lobes, the first set of target lobes being located approximately 180° from the second set of target lobes.

The disclosed technology provides numerous technical effects and benefits including improving the accuracy of torque detection using a torque sensor. In particular, the disclosed technology uses various techniques and configurations to ensure electromagnetic decoupling between first and second channels in a torque sensor. This can lead to more accurate determination of torque for use in applications, such as automotive applications (e.g., torque in a steering column).

Torque sensors according to example embodiments of the present disclosure will now be described with reference to FIGS. 1-9.

FIG. 1 depicts a schematic of select portions of a single channel of a torque sensor including processing circuitry according to example embodiments of the present disclosure. As shown in FIG. 1, in this example, the torque sensor 100 includes an excitation coil formed by an excitation winding 1, one or more receiver coils formed by a first detection winding 3 (hereinafter referred to as the sine winding 3) and a second detection winding 5 (hereinafter referred to as the cosine winding 5), and a rotor targets 7. Further, the rotor target 7 can be associated with the sine winding 3 and the cosine winding 5. The excitation coil and the receiver coils can be formed on a first member (not shown) and the rotor target 7 can be formed on a second member (also not shown) in such a manner that relative movement between the first member and the second member causes a corresponding relative movement (e.g., rotary movement) between, on the one hand, the excitation coil and the receiver coils, and on the other hand, the rotor target 7.

Aspects of the present disclosure are discussed with reference to receiver coils having a sine winding and a cosine winding for purposes of illustration and discussion. Those of ordinary skill in the art, using the disclosures provided herein, will understand that any number of windings/coils can be used with any suitable spacing (e.g., three windings with 120° spacing) without deviating from the scope of the present disclosure.

The excitation winding 1, the sine winding 3 and the cosine winding 5 can each be formed by a respective conductive winding, with the ends of each conductive winding electrically coupled to respective terminals of processing circuitry (e.g., integrated circuit 9), such as an Application Specific Integrated Circuit (ASIC) or an Application Specific Standard Product (ASSP). In other examples, the integrated circuit 9 could alternatively utilize multiple interconnected devices and/or can be implemented using one or more suitable components (e.g., electronic components, such as discrete electronic components).

As shown in FIG. 1, the integrated circuit 9 includes a transmission ("TX") drive stage 11 which generates an alternating electrical signal for supply to the excitation coil.

In this example, the TX drive stage 11 is a free running oscillator that generates an alternating electrical signal at a drive frequency determined by the inductance of the excitation coil and the capacitance of a capacitor 13 connected in parallel to the excitation winding 1.

Supplying an alternating current to the excitation winding 1 induces electromotive forces in the sine winding 3 and the cosine winding 5, which cause current to flow in the sine winding 3 and the cosine winding 5. As a result of the layout of the sine winding 3 and the cosine winding 5 with respect to the layout of the excitation winding 1, the forces induced directly in the sine winding 3 and the cosine winding 5 are balanced and therefore cause negligible current to flow in the sine winding 3 and the cosine winding 5. However, the electromotive forces induced via the rotor targets 7 do cause current to flow in the sine winding 3 and the cosine winding 5. As shown in FIG. 1, the sine winding 3 and the cosine winding 5 are separate windings such that separate currents flow in the sine winding 3 and the cosine winding 5. The sine winding 3 and the cosine winding 5 are electrically coupled to separate terminals of the integrated circuit 9, with the current flowing in the sine winding 3 being processed to provide a sine output signal 23 and the current flowing in the cosine winding 5 being processed to provide a cosine output signal 25. The relative magnitudes of the sine output signal 23 and the cosine output signal 25 are indicative of the relative position of the first member and the second member.

On entering the integrated circuit 9, current flowing in the sine winding 3 first goes through an EMC filtering stage 15, to reduce signal components at frequencies away from the drive frequency. The filtered out signal components may be caused, for example, by interference from electrical signals generated by other nearby electrical components.

The filtered electrical signal then goes through a synchronous demodulation stage 17 in which the filtered electrical signal is mixed with a demodulation signal from the TX drive stage 11. The demodulated electrical signal then passes through a low pass filtering stage 19 to remove the high frequency components corresponding to harmonics of the drive signal, leaving the baseband component, and then passes through gain and output buffer stage 21, which allows an adjustable gain to be applied before the sine output signal 23 is output by the processing circuitry 9. The signals can then be processed to determine torque. As will be apparent from FIG. 1, current induced in the cosine winding 5 also undergoes EMC filtering 15, synchronous demodulation 17, low pass filtering 19 and gain and output buffering 21 within the processing circuitry 9, before being output as the cosine output signal 25.

Figure 2:
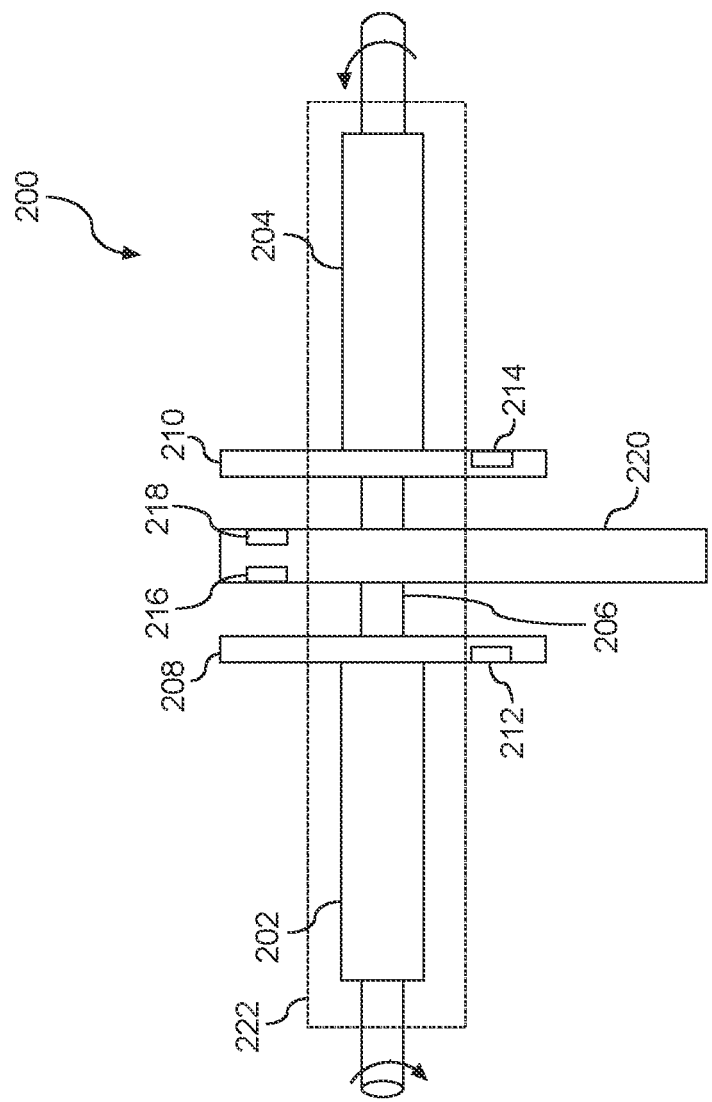
FIG. 2 depicts a schematic of a torque sensor according to example embodiments of the present disclosure.

FIG. 2 depicts a schematic of a torque sensor according to example embodiments of the present disclosure. The torque sensor 200 can include multiple channels to detect the positions of two rotors relative to a member (e.g., as in a steering column). As shown in FIG. 2, a torque sensor 200 can include a stator circuit board 220. The stator circuit board 220 can be arranged between a first rotor 208 and a second rotor 210. The first rotor 208 and the second rotor 210 can be configured to be rotatable relative to one another and/or with respect to the stator circuit board 220. The inductive torque sensor 200 can also include an excitation coil (not shown) in addition to an oscillator circuit (not shown). The excitation coil can be configured to generate a periodic alternating current signal and can couple it into the excitation coil during operation of the torque sensor 200.

In some embodiments, the inductive torque sensor 200 can be used to determine the torque (e.g., steering torque) of a steering device, including the steering column of an automobile. As shown, the steering column 222 includes a torsion element 206 (torsion spring element) that can be positioned between a steering column section 202 and a second steering column section 204. The steering torque can be determined based at least in part on the torsion of the section of the steering column 222 in which the torsion element 206 is arranged. Further, the torsion of the steering column section 202 relative to the steering column section 204 relative can be determined.

The first rotor 208 can be arranged at a first end of the torsion element 206 and the second rotor 210 can be arranged at a second end of the torsion element 206 that is opposed to the first end. On the sides facing the rotor 208 and the rotor 210, the stator circuit board 220 can include the first receiver 216 and the second receiver 218. Further, a first rotor target 212 can be coupled to the first rotor 208. A second rotor target 214 can be coupled to the second rotor 210. In some embodiments, the first rotor 208 and/or the second rotor 210 can include respective pluralities of target lobes (as will be discussed in detail below).

The first receiver 216 (e.g., sine and/or cosine windings) can be associated with the first rotor target 212 and a side of the first receiver 216 facing the first rotor target 212 can have a number M of periodically repeated receiver structures. A second receiver 218 (e.g., sine and/or cosine windings) can be associated with the second rotor target 214 and a side of the second receiver 218 facing the second rotor target 214 can have a number N of periodically repeated receiver structures. The first receiver 216 and the second receiver 218 can be implemented as receiver coils, each of the first receiver 216 and the second receiver 218 including a periodically repeated loop structure forming the receiver structure of the first receiver 216 and the second receiver 218 respectively. Each periodically repeated structure forms a receiver structure. In some embodiments, a number M of the first receiver structures of the first receiver is determined based on a number of N of the second receiver structures such that M=2N. In some embodiments, a number M of the first receiver structures of the first receiver is determined based on a number of N of the second receiver structures such that M=2N±1.

The rotor 208 can include a first rotor target 212 associated with a first channel of the torque sensor 200. The rotor 210 can include a second rotor target 214 associated with a second channel of the torque sensor 200. Rotation of the rotor 208 can change an alignment between the rotor target 212 and corresponding first receiver 216 of the first channel, thereby changing a strength in inductive coupling between the first rotor target 212 and the first receiver 216. Rotation of the rotor 210 can change a distance between second rotor target 214 and the second receiver 218 of the second channel, thereby changing a strength in inductive coupling between the second roto target 214 and the second receiver 218. This change in strength of the inductive coupling(s) can be processed to determine signals indicative of a position of the rotors 208 and 210. The torsion (e.g., the steering torque) of the steering column section 202 and the steering column section 204 can be determined based at least in part on a position of the first rotor target relative to the first receiver structure (e.g., a first measured rotational angle) and a position of the second rotor target relative to the second receiver structure (e.g., a second measured rotational angle). The difference between the two measured rotational angles (e.g., angle difference method) can be used to determine torque.

Figure 3:
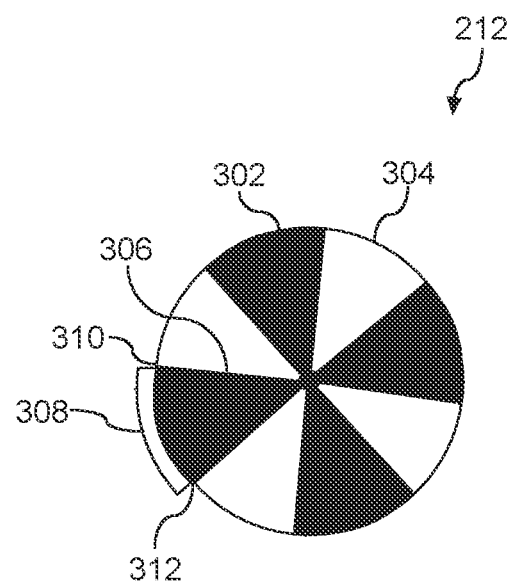
FIG. 3 depicts a plan view of a first rotor target and electromotive forces generated in a sine winding of a first receiver according to example embodiments of the present disclosure.
Figure 3:
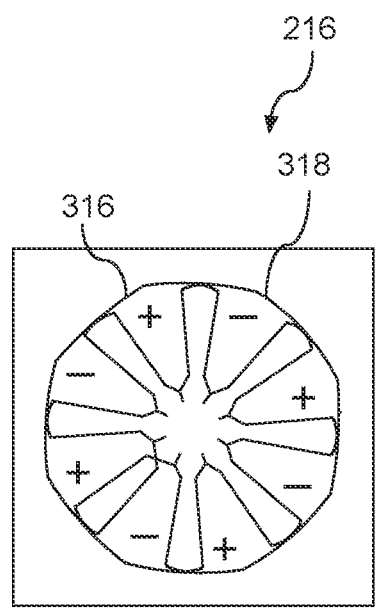
Figure 4:
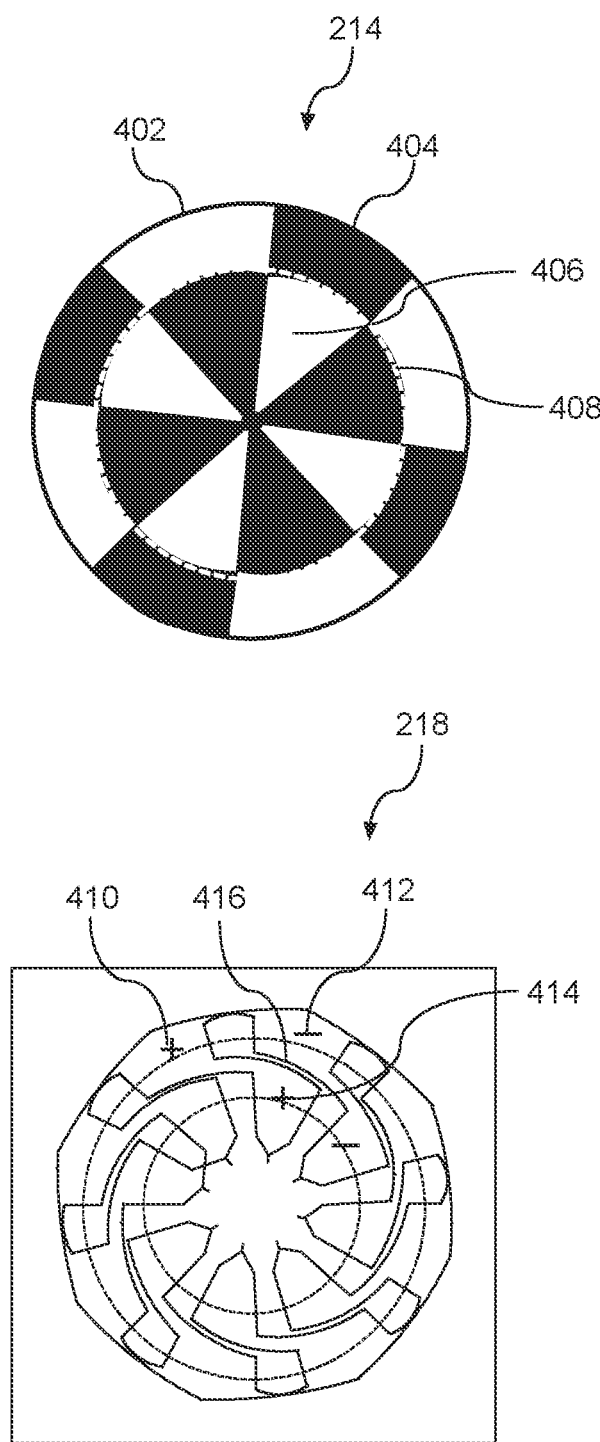
FIG. 4 depicts a plan view of a second rotor target and electromotive forces generated in a sine winding of a second receiver according to example embodiments of the present disclosure.

FIGS. 3 and 4 depict rotor targets and receivers for different channels for a torque sensor according to example embodiments of the present disclosure. The configuration of the rotor targets and receivers described with reference to FIGS. 3-4 can be used, for instance, when a number M of the first receiver structures of the first receiver is determined based on a number of N of the second receiver structures such that M=2N to reduce interference between channels in the torque sensor. The configuration of the rotor targets and receivers described with reference to FIGS. 3-4 can also be used, for instance, when a number M of the first receiver structures of the first receiver is determined based on a number of N of the second receiver structures such that M=2N±1.

For instance, FIG. 3 depicts a plan view of a pattern of conductive material of a first rotor target 212 and a corresponding first receiver 216 (e.g., sine winding) for a first channel of a torque sensor (e.g., torque sensor 200) according to example embodiments of the present disclosure. As shown, the first rotor target 212 can include a plurality of target lobes 302 (e.g., four target lobes).

The first rotor target 212 includes alternating structural phases in the circumferential direction. For instance, a first structural phase corresponds to the presence of a target lobe 302. A second structural phase corresponds to an absence of a target lobe 302. As shown, the structural phase of the first rotor target 212 is constant in a radial direction but varies along a circumferential direction. For instance, there is a structural phase shift every 45° in the first rotor target 212. In this way, there can be an electrical phase shift every 180° on the scale of the receiver 216.

One example target lobe 306 extends between 310 and 312 and has an angular width 308. The angular width 308 of each target lobe is about 45° in mechanical terms on the sale of the target and with an electrical phase shift every 180° on the scale of the receiver 216. The angular width 308 of each target lobe of the first rotor target 212 can be selected to reduce a coupling with the second receiver 218. For instance, in some embodiments, this can be equal to the period of each receiver structure on the first receiver 216.

The first receiver 216 can include a shaped receiver coil such that the signal received on it varies as a sinusoidal function with target position. Like any sinusoid, the receiver coil can have both amplitude and phase. A structural phase of the receiver coil can vary with position along the measurement path. More particularly, the receiver coil can have a plurality of receiver structures with a sinusoidal variation. Each receiver structure can be associated with either a positive structural phase or a negative structural phase by using different winding directions (clockwise and anti-clockwise). For instance, in the example of FIG. 3, the first receiver 216 can include a plurality of positive receiver structures 316 and a plurality of negative receiver structures 318. As shown, first receiver 216 can have a structural phase that is constant in the radial direction (e.g., stays positive or negative) but varies (e.g., changes from positive to negative or vice versa) in the circumferential direction.

Aspects of the present disclosure are discussed with reference to a sinusoidal receiver coil shape. Those of ordinary skill in the art, using the disclosures provided herein, will understand that other methods of a sinusoidal response from a coil can be used without deviating from the scope of the present disclosure, such as by approximating the sine to a 'square wave' shape, careful placement of 'box' or 'square' shaped coils, separation to the target to smooth the 'square wave' response, etc.

FIG. 4 depicts a plan view of a second rotor target 214 and a second receiver 218 according to example embodiments of the present disclosure. As shown, the second rotor target 214 can include a plurality of target lobes 402. The second rotor target 214 includes alternating structural phases in both the circumferential direction and the radial direction. For instance, a first phase corresponds to the presence of a target lobe 402. A second phase corresponds to an absence of a target lobe 402. As shown, the structural phase of the second rotor target 214 can vary along a circumferential direction. For instance, there is a structural phase shift every 45° in the second rotor target 214 along the circumferential direction. Further, the second rotor target 214 includes alternating phases in the radial direction. For example, a first structural phase can correspond to an outer portion of the second rotor target 214 that includes the outer lobe portion 404. Additionally, a second structural phase can correspond to an inner portion of the second rotor target 214 that includes the inner lobe portion 406 (absence of a conductor). The boundary (e.g., structural phase shift) between the outer portion of the second rotor target 214 and the inner portion of the second rotor target 214 is indicated by the specific points 408. As shown, the phase of the rotor target 214 varies along both the radial direction as well as the circumferential direction. Further, the phase of the rotor target 214 can vary in a manner that corresponding to the second receiver 218.

Positive and negative portions of example receiver structures of an example second receiver 218 are shown in FIG. 4. As shown, the second receiver 218 can have a structural phase that varies (e.g., changes from positive to negative or vice versa) along both a radial direction and a circumferential direction. As an example of a structural phase of the second receiver 218 varying in the circumferential direction, a first phase can correspond to the portion 410 of the second receiver 218 and a second phase can correspond to the portion 412 of the second receiver 218. As an example of the phase varying in the radial direction, a first phase can correspond to the portion 414 of the second receiver 218 and a second phase can correspond to the portion 412 of the second receiver 218. Further, a structural phase shift in the radial direction of the second receiver 218 can occur at a specific point along the radial direction of the second receiver 218. For example, the structural phase shift in the radial direction of the second receiver 218 can occur at the point 416. In some embodiments, the structural phase shift in the radial direction can be approximately 180° (e.g., the phase shift from the portion 414 to the portion 412).

Figure 5:
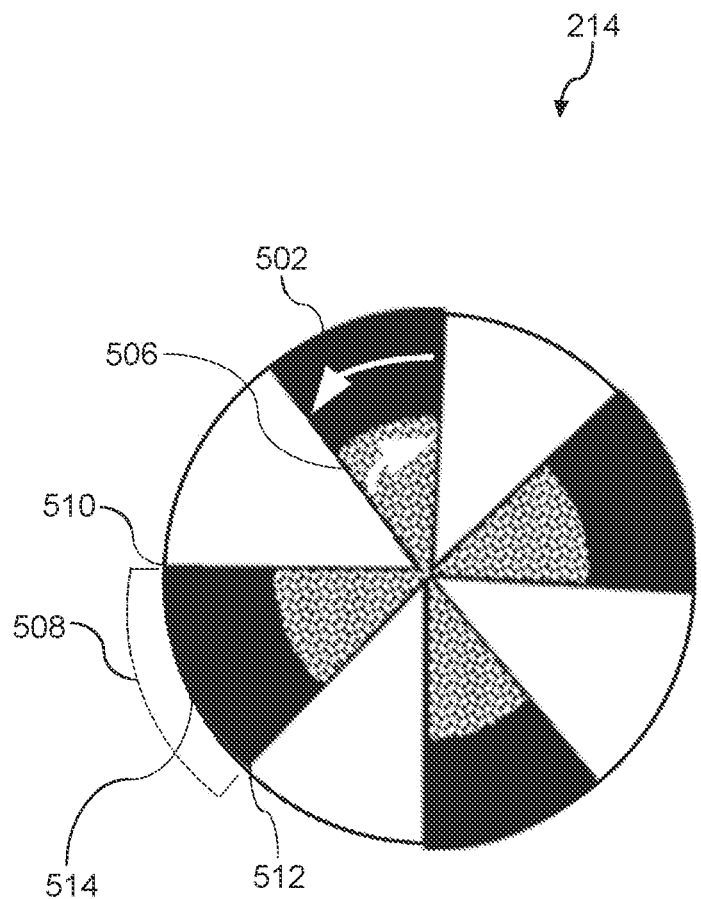
FIG. 5 depicts a plan view of a second rotor target including ferrite portions according to example embodiments of the present disclosure.

FIG. 5 depicts a plan view of a second rotor target according to example embodiments of the present disclosure. The second rotor target 214 can include portions that are conductive material and portions that are magnetic and non-conductive material. For example, the outer lobe portion 506 of one of the plurality of target lobes 502 can include conductive material. Further, an inner lobe portion 504 of the same lobe can include magnetic and non-conductive material. In some embodiments, the inner lobe portion 504 can include or be covered in ferrite in order to enhance the magnetic field of the inner lobe portion 504. In this manner, the phase of the second rotor target 214 can vary along both a radial direction and a circumferential direction.

In some embodiments, both channels of the torque sensor can include rotor targets and receivers having the same configuration, such as the configuration described with reference to FIG. 3. However, in this case, to reduce interference among channels, a number M of the first receiver structures of the first receiver is determined based on a number of N of the second receiver structures such that M=2N±1. In this case and in some implementations, the angular width of each target lobe of the first rotor target of a first channel can be adjusted to be approximately equal to an angular width corresponding to a single period of the plurality of second receiver structures of the second receiver of a second channel.

Figure 6:
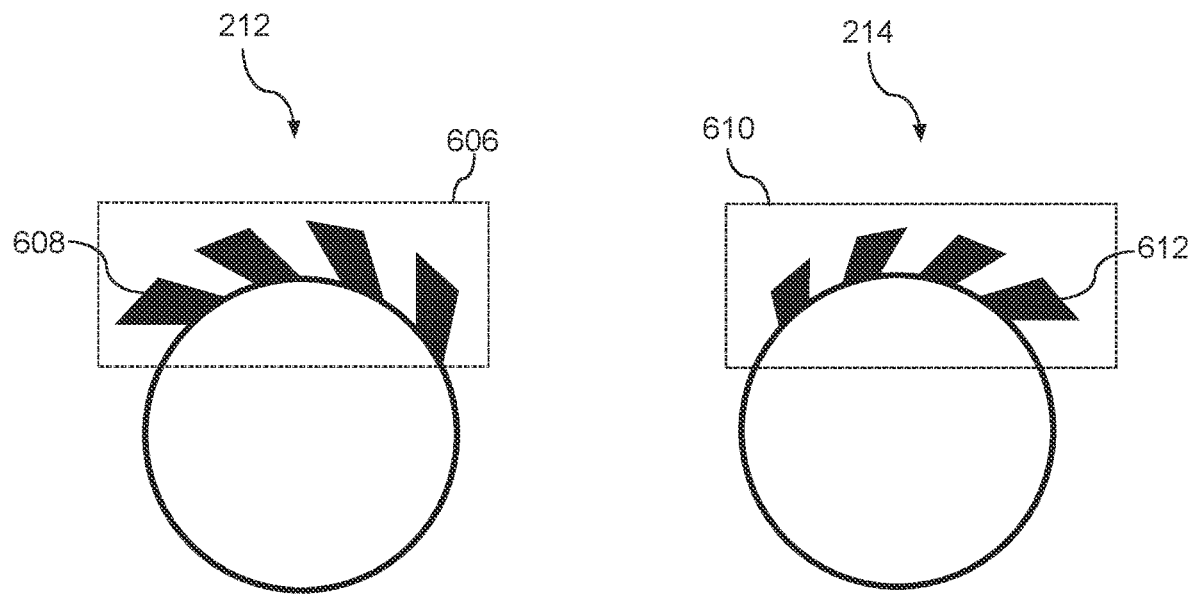
FIG. 6 depicts a plan view of a portion of rotor targets according to aspects of the present disclosure.

FIG. 6 depicts a plan view of a portion of example rotor targets according to example aspects of the present disclosure. FIG. 6 shows the first rotor target 212 (also depicted in FIG. 2), which is configured to be orthogonal to the rotor target 214. The first rotor target 212 can include a plurality of target lobes 606 (e.g., four target lobes) which includes the target lobe 608. The first rotor target 212 includes alternating phases in the circumferential direction. For instance, a first phase corresponds to the presence of the target lobe 608. A second phase can corresponds to the absence of a target lobe 608 or any of the plurality of lobes 606. As such, a phase of the first rotor target 212 can vary along a circumferential direction of the first rotor target 212. Further, a phase of the first rotor target 212 can be continuously variable along the radial direction of the first rotor target 212.

Further, the second rotor target 214 can include a plurality of target lobes 610 (e.g., four target lobes) including the target lobe 612. The second rotor target 214 includes alternating phases in the circumferential direction. For instance, a first phase corresponds to the presence of a target lobe 612. A second phase corresponds to an absence of a target lobe 612 or any of the plurality of target lobes 610. Further, a phase of the second rotor target 214 can be continuously variable along the radial direction of the first rotor target 214. The variation of structural phase in a radial direction in the first rotor target 212 and the second rotor target 214 is of substantially equal magnitude but opposing directions with respect to each other.

Figure 7:
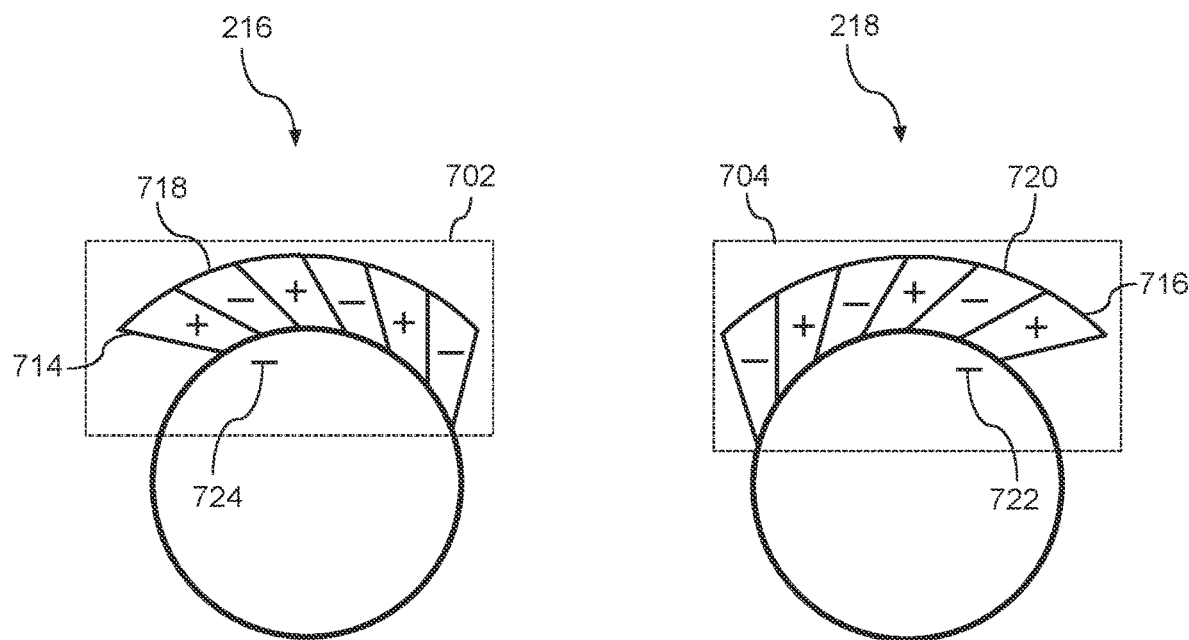
FIG. 7 depicts a plan view of a portion of receiver structures according to aspects of the present disclosure.

FIG. 7 depicts a plan view of a portion of receiver structures according to aspects of the present disclosure. FIG. 7 shows first receiver structures 702 of the first receiver 216 that is also depicted in FIG. 2. The first receiver 216 can include alternating phases in the circumferential direction. For instance, a first phase corresponds to the receiver structure 714. A second phase corresponds to the receiver structure 718. As such, the phase of the first receiver 216 varies along a circumferential direction of the first receiver 216. Further, a phase of the first receiver 216 can vary continuously along at least a portion of a radial direction of the first receiver 216. For example, the portion 714 (e.g., a positive portion) can correspond to a first phase and the portion 724 (e.g., a negative portion) can correspond to a second phase, and thereby vary phase in the radial direction of the first receiver 216.

The second receiver 218 can include alternating phases in the circumferential direction. For instance, the receiver structure 720 has a first phase. The receiver structure 716 has a second phase. As such, the phase of the second receiver 218 varies along a circumferential direction of the second receiver 218. Further, a phase of the second receiver 218 can vary continuously along at least a portion of a radial direction of the second receiver 218.

In FIG. 7, the plurality of receiver structures 702 are not illustrated as being continuously repeated about the entire circumference of the first receiver 216. Similarly, the plurality of receiver structures 704 are not illustrated as being continuously repeated about the entire circumference of the second receiver 218. Those of ordinary skill in the art, using the disclosures provided herein, will understand that the receiver structures 702 can be continuously repeated about the entire 360° circumference of the first receiver 216.

Similarly, the receiver structures 704 can be continuously repeated about the entire 360° circumference of the first receiver 218.

Figure 8:
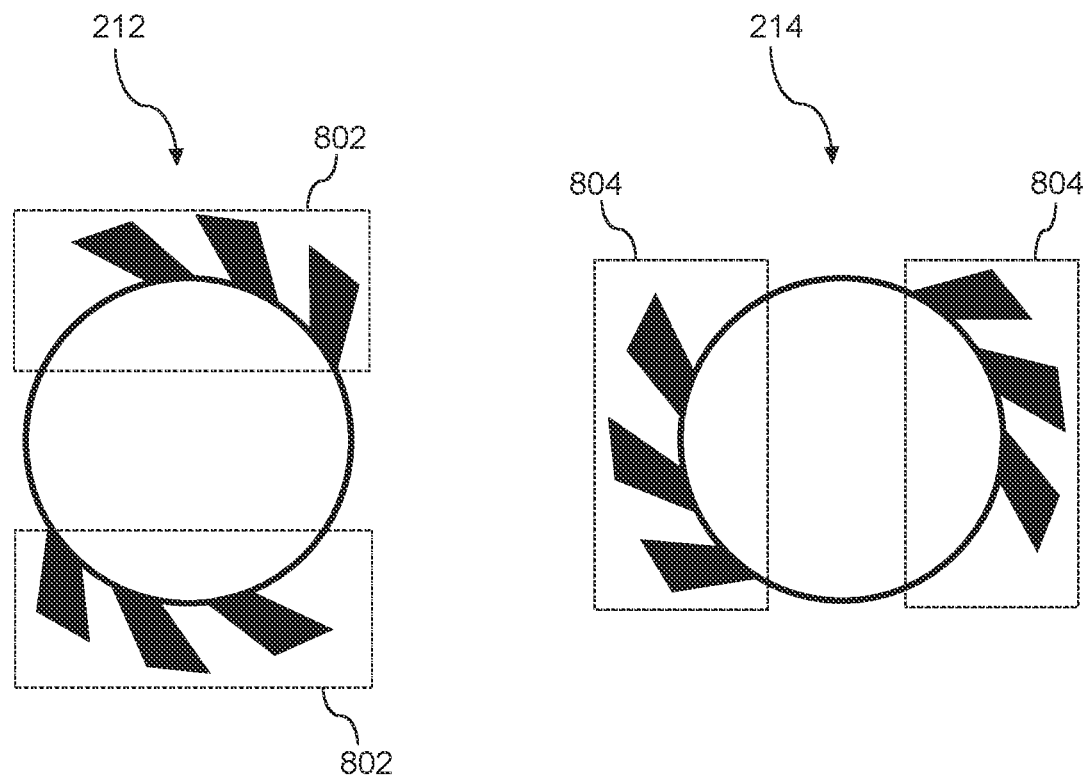
FIG. 8 depicts a plan view of rotor targets according to aspects of the present disclosure.

FIG. 8 depicts a plan view of rotor targets according to aspects of the present disclosure. FIG. 8 shows an example of geometric decoupling between a rotor target 212 and the rotor target 214. As shown, the plurality of target lobes 802 of the first rotor target 212 are orthogonal to the plurality of target lobes 804 of the second rotor target 214 (the plurality of target lobes 802 are rotated 90° relative to the plurality of target lobes 804). By configuring the plurality of target lobes 802 to be orthogonal to the plurality of target lobes 804, interference among the different channels of the torque sensor can be reduced.

In some embodiments, the plurality of target lobes 802 of the first rotor target 212 do not overlap the plurality of target lobes 804 of the second rotor target 214. In some embodiments, the plurality of target lobes 802 of the first rotor target 212 and the plurality of target lobes 804 of the second rotor target 215 have less than 120° cumulative overlap about the circumferential direction, such as less than 90° cumulative overlap about the circumferential direction, such as less than 30° cumulative overlap about the circumferential direction, such as less than 15° cumulative overlap about the circumferential direction, such as less than 10° cumulative overlap about the circumferential direction, such as less than 5° cumulative overlap about the circumferential direction. As used herein, cumulative overlap refers to a total amount of circumferential overlap between target structures, irrespective of whether the overlap is contiguous or not contiguous.

As shown in FIG. 8, the plurality of target lobes 802 of the first target 212 can include a first set of target lobes and a second set of target lobes that are located about 180° apart from one another. Similarly, the plurality of target lobes 804 of the second target 214 can include a first set of target lobes and a second set of target lobes located about 180° apart from one another.

Figure 9:
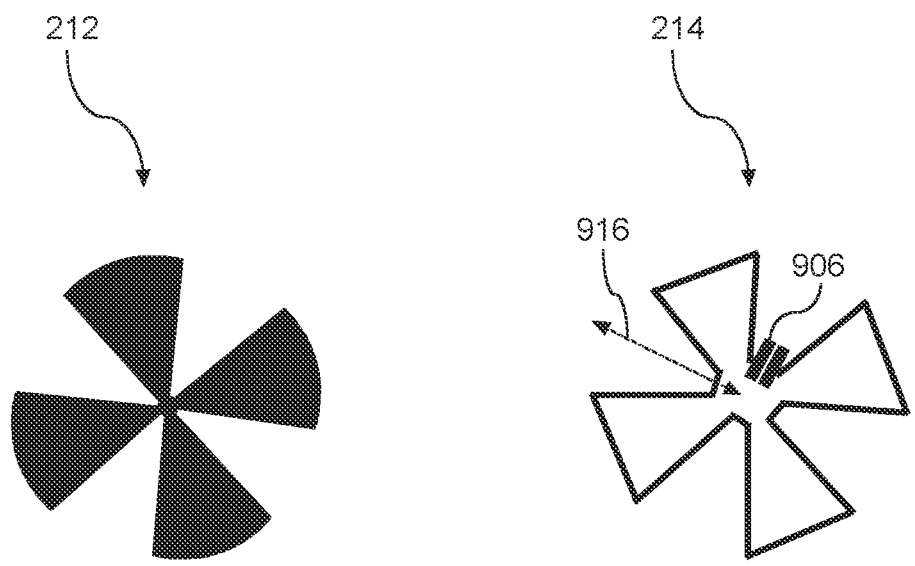
FIG. 9 depicts a plan view of rotor targets with respective resonant and non-resonant target structures according to aspects of the present disclosure.

FIG. 9 depicts a plan view of rotor targets with respective resonant and non-resonant circuits according to aspects of the present disclosure. FIG. 9 shows rotor targets including the first rotor target 212 and the second rotor target 214. The first rotor target 212 and/or the second rotor target 214 can be composed of solid metal or a closed loop that is formed by a conductive track. In this example, the first rotor target 212 is a non-resonant target and the second rotor target 214 is a resonant target. Further, the second rotor target 214 can include a resonant circuit 906 that includes an inductor and/or a capacitor. In some embodiments, the first rotor target 212, which can be non-resonant, can be converted into a resonant target by adding a capacitor so that the first rotor target 212 has a resonant frequency that is substantially equivalent to the frequency of a transmission coil drive frequency.

A time varying magnetic field created by the first rotor target 212 (e.g., the non-resonant rotor target) can be phase shifted relative to a time varying magnetic field created by the second rotor target 214 (e.g., the resonant rotor target). Further, the time varying magnetic field of the first rotor target 212 can be phase shifted by about 90° relative to the time varying magnetic field created by the second rotor target 214.

In some embodiments, a number M of the first receiver structures of the first receiver is determined based on a number of N of the second receiver structures such that M=2N±1.

While the present subject matter has been described in detail with respect to specific example embodiments thereof, it will be appreciated that those skilled in the art, upon attaining an understanding of the foregoing may readily produce combinations, alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A torque sensor comprising:
   at least one excitation coil;
   at least one oscillator circuit coupled to the excitation coil, wherein the oscillator circuit is configured to generate a periodic voltage signal and energize the excitation coil with the periodic voltage signal;
   a first channel, the first channel comprising:
      a first receiver, the first receiver comprising a plurality of first receiver structures that are periodically repeated; and
      a first rotor target configured to be coupled to a first rotor, the first rotor target configured to affect a strength of the inductive coupling between the excitation coil and the first receiver;
   a second channel; the second channel comprising:
      a second receiver, the second receiver comprising a plurality of second receiver structures that are periodically repeated; and
      a second rotor target configured to be coupled to a second rotor, the second rotor target configured to affect a strength of the inductive coupling between the excitation coil and the second receiver; and
   processing circuitry configured to provide a first signal associated with the first channel indicative of a position of the first rotor target relative to the first receiver; the processing circuitry configured to provide a second signal associated with the second channel indicative of a position of the second rotor target relative to the second receiver;
   wherein torque sensor comprises one or more features to reduce electromagnetic coupling of the first channel and the second channel.

2. The torque sensor of claim 1, wherein M is a number of the first receiver structures and N is a number of the second receiver structures; wherein M=2N±1.

3. The torque sensor of claim 2, wherein the first rotor target has a plurality of target lobes that are periodically repeated, each target lobe having an angular width, wherein the angular width of each target lobe of the first rotor target is approximately equal to an angular width corresponding to a single period of the plurality of second receiver structures of the second receiver.

4. The torque sensor of claim 1, wherein a structural phase shift in a radial direction of the first receiver occurs at a specific point along the radial direction of the first receiver.

5. The torque sensor of claim 4, wherein the structural phase shift is approximately 180°.

6. The torque sensor of claim 4, wherein a structural phase of the first rotor target varies along both a circumferential direction and a radial direction of the rotor target in a manner corresponding to the first receiver.

7. The torque sensor of claim 6, wherein a first portion of the first rotor target comprises a conductive material and a second portion of the first rotor target comprises a magnetic and non-conductive material.

8. The torque sensor of claim 1, wherein a structural phase of the second receiver varies along a circumferential direction and is constant along a radial direction of the second receiver.

9. The torque sensor of claim 8, wherein a structural phase of the second rotor target varies along a circumferential direction and is constant along a radial direction of the second rotor target in a manner corresponding to the second receiver.

10. The torque sensor of claim 1, wherein a structural phase of the first receiver varies continuously along at least a portion of a radial direction of the first receiver.

11. The torque sensor of claim 10, wherein the structural phase of the second receiver varies continuously along at least a portion of the radial direction of the second receiver.

12. The torque sensor of claim 11, wherein the first receiver and the second receiver have a variation of structural phase in a radial direction which is of substantially equal magnitude but opposing directions with respect to each other.

13. The torque sensor of claim 1, wherein a time varying magnetic field created by the first rotor target is phase shifted relative to a time varying magnetic field created by the second rotor target.

14. The torque sensor of claim 13, wherein the time varying magnetic field created by the first rotor target is phase shifted by about 90° relative to the time varying magnetic field created by the second rotor target.

15. The torque sensor of claim 13, wherein the second rotor target comprises a resonant circuit having an inductance and a capacitance.

16. The torque sensor of claim 1, wherein a plurality of target lobes are not continuously repeated about an entire circumference of the first receiver.

17. The torque sensor of claim 16, wherein a plurality of target lobes of the first rotor target have less than 120° cumulative overlap with a plurality of target lobes of the second rotor target.

18. The torque sensor of claim 16, wherein the plurality of target lobes comprises a first set of target lobes and a second set of target lobes, the first set of target lobes being located approximately 180° from the second set of target lobes.

* * * * *